United States Patent [19]

Huvey et al.

[11] Patent Number: 4,858,653
[45] Date of Patent: Aug. 22, 1989

[54] STRUCTURE FORMED FROM A STRAIGHT STRIP BENT OR CORRUGATED AND THE METHOD OF MANUFACTURING SAME

[75] Inventors: Michel Huvey, Bougival; Anh T. Do, La Celle Saint Cloud; Jean-Michel Gerez, Le Vesinet; Lucien Le Gallais, Orgeval, all of France

[73] Assignee: Institut Francais du Petrole et Coflexip, Rueil-Malmaison, France

[21] Appl. No.: 947,750

[22] Filed: Dec. 30, 1986

[30] Foreign Application Priority Data

Dec. 30, 1985 [FR] France ................................ 85 19429

[51] Int. Cl.$^4$ ............................................... F16L 9/14
[52] U.S. Cl. ....................................... 138/144; 138/32; 138/129
[58] Field of Search .............. 138/106, 108, 114, 121, 138/122, 137, 148, 149, 32, 129, 144; 264/286; 425/396

[56] References Cited

U.S. PATENT DOCUMENTS

| 230,033 | 7/1880 | Merriam | 138/148 |
| 289,744 | 12/1883 | Aldrich | 138/148 |
| 3,102,776 | 9/1963 | Steinmann et al. | 264/286 |
| 4,063,344 | 12/1977 | Jones et al. | 138/149 X |
| 4,611,636 | 9/1986 | Kanao | 138/173 X |

FOREIGN PATENT DOCUMENTS 262617 2/1913 Fed. Rep. of Germany ...... 138/148

Primary Examiner—William A. Cuchlinski, Jr.
Attorney, Agent, or Firm—Antonelli, Terry & Wands

[57] ABSTRACT

A tubular structure is provided including an internal tube and an external tube which is formed from at least a straight strip bent or undulated, whose width is disposed substantially along at least a line normal to said tubes which it separates. It may be used, for example filled with an insulating lagging, by surrounding a pipe line or being adapted to the pipe line which then forms the internal tube.

9 Claims, 5 Drawing Sheets

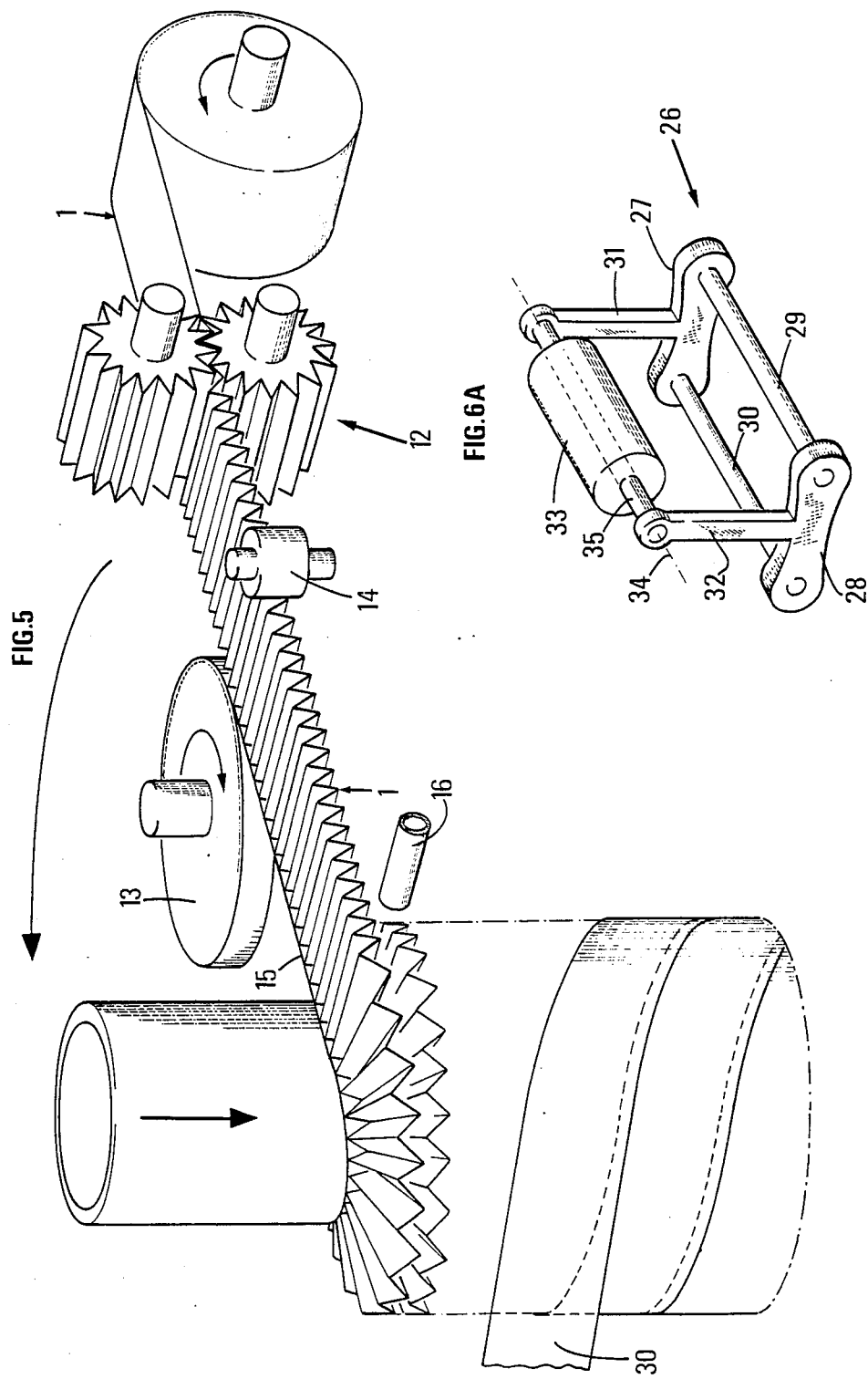

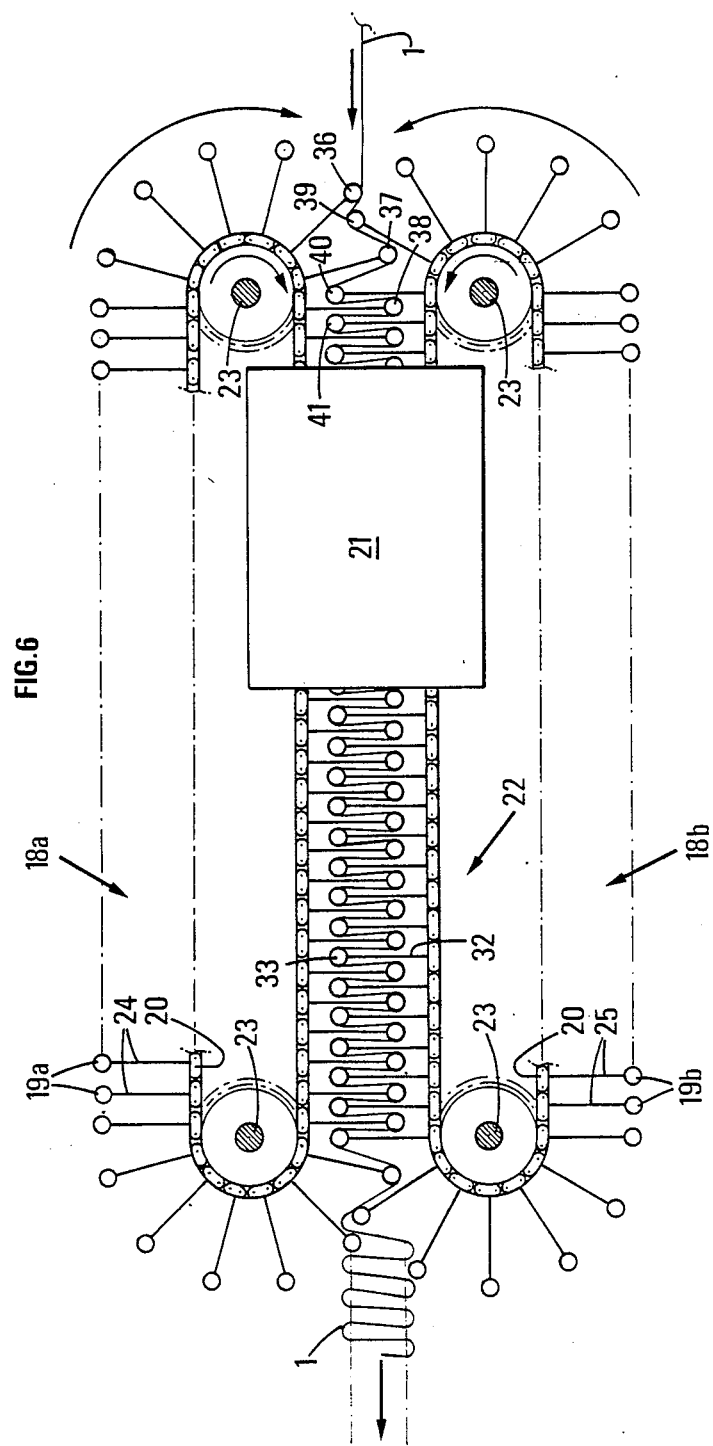

STRUCTURE FORMED FROM A STRAIGHT STRIP BENT OR CORRUGATED AND THE METHOD OF MANUFACTURING SAME

BACKGROUND OF THE INVENTION

1. Field of the Invention

The present invention relates to a tubular structure formed from a straight strip bent or corrugated and the method of manufacturing same. It applies more particularly to the insulation of pipe lines serving more particularly for transporting hot or cold fluids, such as oil products (heavy oil or natural liquid gas), this structure being lagged with materials having heat insulation properties such for example as foams.

2. Description of the prior art

In the following description, the case of a pipe line will be considered by way of example in which the inner surface is formed by an internal sheath or tube.

It is known to form heat insulated pipe lines by causing a cellular product, such as a polyurethane foam, to expand between a mechanically tough tubular duct and another duct which will subsequently serve as protection.

The first duct will be called internal tube and the second external tube in the rest of the description.

A layer of glass wool, rock wool or another insulator may also be deposited on the surface of the internal tube, which is wound on like a ribbon or which is laid in the form of half shells. The external tube is then formed about an insulation by an appropriate means, for example by assembling thin aluminium foils.

The mechanical resistance to crushing of the assembly thus formed is entirely conditioned by the respective strengths of the insulating means and of the external tube, the internal tube only beginning to participate when the insulating means is completely crushed.

In the case of ducts operating at a high temperature (more than 120° C.) and placed in a concrete filled trench which is intended specially for them, the mechanical stresses undergone by the tube are small and such tubes do not need particular mechanical strength in so far as their insulating means and their external tube are concerned.

This latter may even be not sealed without that being serious since, in operation, if water infiltrates accidently into the insulating means, it will be vaporized.

Such a solution, inexpensive in equipment, is on the other hand very expensive from the civil engineering point of view. It has however the advantage of allowing easy maintenance, since it is relatively easy to penetrate into the protective tunnel of the duct for carrying out an inspection therein.

On the other hand, in the case of ducts buried in the ground, they must withstand all the forces transmitted by the ground and in particular those due to the passage of vehicles.

The external tube must necessarily be sealed, since any water penetrating cannot be readily eliminated in the ground and since a wet insulator is a poor insulator.

Two types of solutions exist, each having their drawbacks.

The first consists in using a rigid and solid external tube equipped with centering means for maintaining a constant spacing between the internal tube and the external tube and in placing therebetween a light insulating means. The problem relates to the sealing at the connections of the external tube and the heat bridges which the centering means may form.

The second consists in using an insulating means sufficiently dense to be sufficiently strong mechanically and to cover it with a less resistant sheath. It is the insulating means which absorbs the forces. Since it is dense, it is not very insulating and it must then be of great thickness. It is therefore costly. On the other hand, the problems of sealing and connecting the external sheath are simplified since it may be a simple extruded thermoplastic tube weldable without difficulty at a temperature which does not damage the insulating means.

SUMMARY OF THE INVENTION

The object of the present invention is to overcome these drawbacks and particularly to provide a method for using both a light insulating means, therefore a good insulating means, usable in small thickness therefore at a low cost, associated possibly with an external tube which is also light, so with low mechanical strength, by placing within the insulating means a reinforcement structure able to transmit to the internal tube which is still mechanically strong, since it conveys the pressurized fluids, all the forces applied to the external tube by the ground.

The present invention relates more particularly to a tubular structure which includes an internal tube and is formed from at least one bent or corrugated strip.

This structure includes then said strip whose width (on the small dimension side) is disposed substantially along at least one perpendicular to said tube. The invention also relates to a tubular structure including an internal tube $S_1$ of radius $R_1$ and an external tube $S_2$ of radius $R_2$. It further comprises, at least one bent or corrugated strip whose width is disposed substantially along at least one perpendicular to at least one of said tubes which it separates. Preferably, the strip will be straight.

The invention relates finally to a method of manufacturing the structure in which said strip is wound about said internal tube while disposing the width of this strip perpendicularly to the wall of said tube.

By curved surface is meant a surface whose radius of curvature has a finite non zero value.

By straight strip is meant a strip whose two largest sides have substantially the same length, such for example as a substantially rectangular or substantially sinusoidal strip.

This strip does not define closed cells over the whole thickness of the structure and consequently the term cylinder structure will not be used since it is reserved for example to "honeycomb" structures.

When the straight strip is bent, a part at least of the bends (used here with the meaning of traces) may be substantially perpendicular to the general direction of the strip, which may be the side with the main dimension.

In one of the embodiments of the invention, bending of the strip is achieved by following lines which are repeated substantially in sets of three, a set of three being characterized by a fold line forming an angle $\alpha$ with a side of the strip, the next fold line being substantially perpendicular to the side of the strip, and the third fold line forming with the side of the strip an angle $\beta$ substantially supplementary to angle $\alpha$, that is to say that $\alpha + \beta = \pi$ radians or 180 degrees, the three folds may be jointing or non jointing.

After folding and laying, the trace on the surface of the internal tube $S_1$ is a broken line which is alternately aligned following substantially the general direction of the laid strip, then a line in the shape of a V bending back to a greater or lesser degree on itself; the trace on the external surface $S_2$ is similar, but the V is smaller and the trace following the main direction of the strip has an appreciable length, whereas on the internal surface the trace along the main direction of the strip may be for example very small and even at the limit zero.

In this embodiment, good results are obtained when $S_1$ is the surface with smallest radius $R_1$.

In another embodiment, when the strip is bent thus forming a succession of substantially flat surfaces $\Delta, \Delta', \Delta'', \ldots$ the trace of the surfaces $\Delta, \Delta', \Delta''$ on the surfaces or tubes $S_1$ and $S_2$ defines a broken line whose angle $\gamma$ defined by two adjacent segements a, b and corresponding to the surface $S_1$ relative to the smallest radius is less than the angle $\epsilon$ defined by two adjacent segments a', b', belonging to the same surfaces $\Delta, \Delta', \ldots$ and corresponding to the surface $S_1$ relative to the largest radius.

In another embodiment where the structure is formed from a corrugated strip thus forming successive elementary waves, the trace of the strip on the surfaces or tubes $S_1$ and $S_2$ defines a substantially sinusoidal line whose distance between two neighbouring crests of two successive waves on the surface $S_1$ with the smallest radius is shorter than that between two neighbouring crests of the same two waves on the surface $S_2$ with largest radius.

These embodiments allow the strip to better reinforce the structure and to transmit to the internal tube, with very small deformation, the forces applied to the external tube.

In the case for example where one at least of the surfaces has a tubular wall, the strip is disposed so that its small dimension or width is laid substantially radially, whereas its large direction follows a direction which is as a whole substantially circumferential, longitudinal or helical on the wall.

This strip may be continuous or discontinuous. The successive traces on the support will be preferably imbricated when the mechanical compression forces to be transmitted are high and spaced apart when these forces are small.

A reinforcement means usable in the present invention is formed by bending a straight strip, for example generally resin impregnated paper, in the fashion of an "accordion" and in laying this strip evenly, the width of the strip being disposed radially about the tube.

If the line joining the non directly adjacent crests of a trace of the folding, for example that of the crests shown by letters, A, C, E in the figures below, and the line joining the opposite crests of the next strip, are jointing on the surface with the smallest curvature, the corresponding lines on the surface with the largest curvature will be at a distance from each other, which means that it will not be formed of closed cells.

The folded strip also has a slight tendency to "lie flat" on the tube during laying, which requires means for holding it in position until the insulting foam, for example, is positioned between the turns of the strip. There is then no problem.

A preferred holding means usable during laying of the bent or corrugated strip consists in bonding its edge to an adhesive ribbon. Then the non bonded side is laid on the tube and the strip is naturally laid radially.

There is moreover only a problem if the "wave length" of folding of the strip is large with respect to the diameter of the internal tube. If the wave length is high, the "base" of such bending should also be cut so that it matches the shape of the internal tube and transmits thereto the forces which it receives from the internal tube.

Another means for carrying out the present invention consists in positioning, still radially about the tube, a strip bent, no longer in the form of an accordion, but in the form of an ornamental "ruff", (sort of compressed sinusoid). Such a structure may be formed by bending a strip of paper about a series of axes offset with respect to each other and by causing the shaped strip to undergo a stabilization treatment, for example heating followed by cooling while in shape, inpregnation with a heat hardenable resin which is polymerized while in shape or simple damping followed by drying.

The strip may also be manufactured directly while in shape, for example from a strip of glass fabric which is impregnated with a heat hardenable resin, or from a ribbon of fabric preimpregnated with heat hardenable resin or thermoplastic resin, heat treatment providing stabilization of the shape.

The strip may also be made from metal and bent in a conventional bending machine, or corrugated by deformation beyond its elastic limit.

The metal will be preferably chosen from those which are poor conductors of heat, among which the stainless steels with a high nickel content (from 8% to 30%) are particularly interesting. Such stainless steels have the further advantage of withstanding well corrosion through products which may diffuse through the internal wall of the tube and which could damage readily corrodible materials.

The strip may also be made from composite materials, formed of continuous or discontinuous, natural, artificial or synthetic, mineral or organic fibers, such as glass, aramide, carbon, cellulose, rayon or polyester fibers, used in the form of felts such as paper, or fabrics or ribbons and bonded by means of thermoplastic resins, such as polyvinyl fluoride (PVF2), polyamides, polyolefins, or heat hardenable resins, such as polyester resins, polyepoxide resins, phenolic resins or polyimide resins.

Known additives, such as sizing agents, may be placed on the fibers for improving the qualities of the interface between the fiber and the resin, without departing from the scope of the invention. Finally, soluble binders, such as those currently used in the manufacture of papers may be used.

The strip may be finally formed of an extruded thermoplastic strip shaped on leaving the extruder by passing through a shaper giving it at the time of cooling thereof the desired corrugated or bent shape.

With this operation finished, it becomes possible to position the light insulating foam which will efficiently fulfill its insulation function with a small thickness and to deposit thereon, for example by extrusion, a sealing sheath of small thickness which will serve as external tube.

When the external tube has compressive forces applied thereto by its environment, in the case in point the pressure exerted by the ground, this pressure is transmitted by the radial structure to the internal tube, which means that the insulating foam does not have compressive forces applied thereto and therefore does not have a tendency to be crushed.

Furthermore, the external sheath, thus supported, withstands well the forces of the ground which it would have been incapable of withstanding if it had not been supported.

Furthermore, since the space between the internal tube and the external tube may be under vacuum, the radial structure prevents the external tube from collapsing on the internal tube.

The insulating foam may also serve for stabilizing the pitch which has been chosen and for maintaining substantially constant spacing.

The structure will of course have to be more resistant if the duct is to be immersed under a great depth of water than if it were to be buried in a garden.

The invention also relates to the use of the structure. In one particularly interesting use, the internal tube of the structure surrounds a pipe line so that the structure forms the reinforcing frame of an external insulating sheath for this pipe line. It may also be directly adapted to a pipe line which thus forms the internal tube of the structure.

This structure may receive an insulating lagging or be placed in a vacuum. This pipe line may be flexible or rigid; the structure may adhere at least partially to the internal tube, either by welding in the case where the structure and the tube are both made from metal, or by bonding in other cases.

For a rigid structure and for example for a rigid pipe line, the sequence of the adherence points is free whereas, on the other hand, in the case of flexible structures it should be avoided having two consecutive adherence points belonging to the same plane such as defined above and the adherence points should be distributed for example on the crests A, C, E etc. ... or A, D, G, I, L etc. ... thus allowing a relative movement of the sheath and of the structure of the invention under compression, extension of flexion of the sheath.

Still within the scope of the present invention, the inner edges of the strips may be given a particular shape adapted so that, once positioned, these edges exactly touch the surface to be lagged. The same goes for the outer edges.

The present invention also relates to a device for manufacturing a corrugated strip from a straight strip. This device comprises two caterpillar tracks, each of these tracks having arms to the end of which are fixed forming elements.

Each of the caterpillar tracks is stretched between two bearing means thus defining rectilinear portions on the tracks.

These tracks are placed opposite each other over one of their respective rectilinear portions. The arms of one of the caterpillar tracks are imbricated in the arms of the other track over the rectilinear portion.

The forming element may comprise a roller.

The arms may be provided at constant intervals on a support element such as a belt or a chain, the distance between two successive arms of the same track considered in the rectilinear part of the track being termed pitch of the caterpillar track.

The diameter of the rollers may be included between a value which is half of the pitch and the pitch itself.

Heating means may be provided on a part of the rectilinear portion where the arms are imbricated.

BRIEF DESCRIPTION OF THE DRAWINGS

The following examples and Figures will give a better understanding of the object of the invention. In these figures by way of indication:

FIG. 5 shows schematically one embodiment of the manufacturing method, FIG. 6 shows a device for giving the strip of the invention a corrugated form, and FIG. 6A shows a detail of the device shown in FIG. 6.

DESCRIPTION OF THE PREFERRED EMBODIMENTS

Figure 1A:
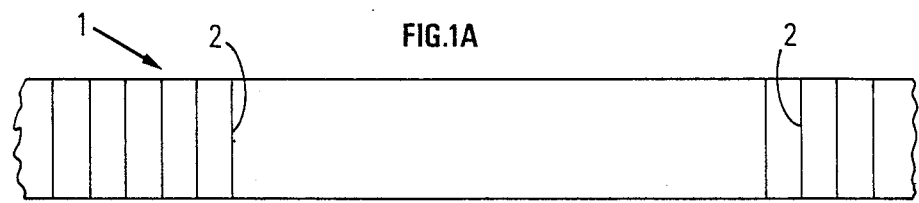
FIGS. 1A and B show examples of straight strips.

In FIG. 1A there has been simply shown a straight and rectangular strip pleated at 2 in a form of an accordion substantially perpendicularly to the main direction (the largest dimension) of the strip.

Figure 1B:
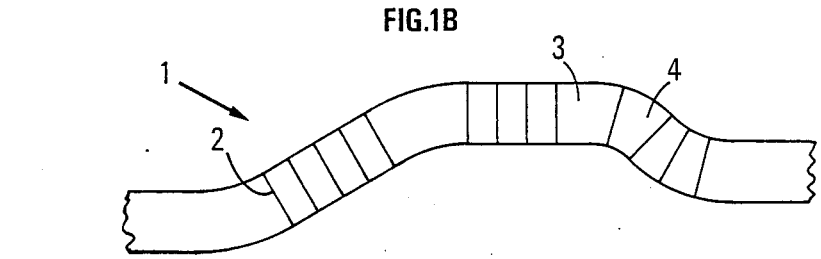

In FIG. 1B a straight strip has been shown having rectangular zones 3 and S shaped zones 4. When the rectangular zones have a substantially zero length, the strip has a roughly sinusoidal shape.

Figure 2A:
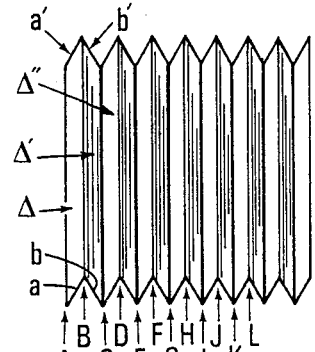
FIGS. 2A and 2B show a first embodiment of the invention, where the strip is folded.
Figure 2B:
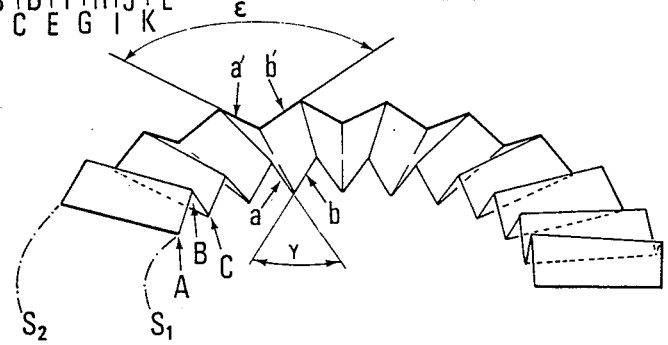

FIG. 2A shows a first embodiment of the invention with a succession of folds substantially perpendicular to the largest dimension which define substantially flat surfaces $\Delta$, $\Delta'$, $\Delta''$ ... whose trace on the surfaces or tubes $S_1$ and $S_2$, after being laid on a tubular wall for example, give a broken line A, B, C, D, ... K, L whose segments have a respective length a, b ... and a', b'... the angle $\gamma$ defined by the segments a and b is less than the angle $\epsilon$ defined by the segments a' and b' belonging to the same surfaces $\Delta$ and $\Delta'$ (FIG. 2b).

In the present text, the term sinusoidal refers to a shape which recalls that of a sinusoid.

Figure 3A:
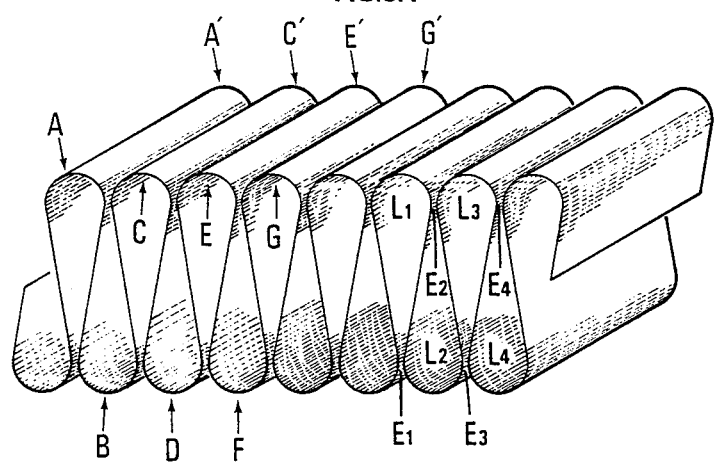
FIGS. 3A and 3B illustrate another embodiment in which the strip is corrugated.
Figure 3B:
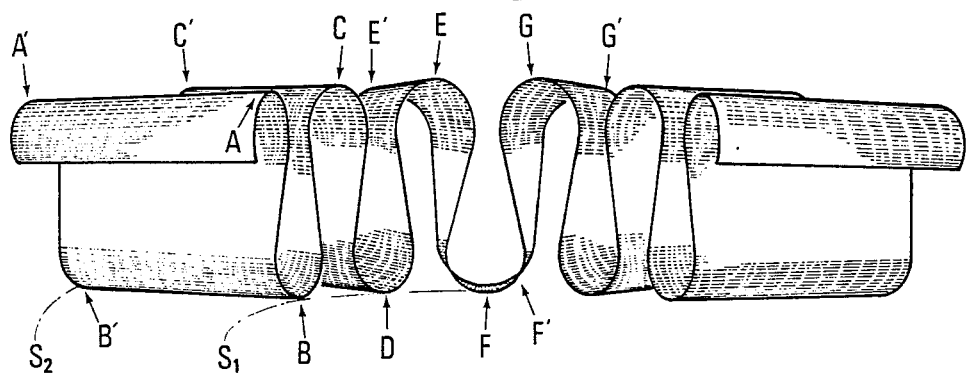

In FIGS. 3A and 3B showing another embodiment, a strip has been corrugated in the shape of an ornamental ruff with a succession of elementary waves. The trace of this strip on the surfaces $S_1$ and $S_2$ (after laying on a tubular wall for example) defines an undulating line which may be substantially sinusoidal A, B, C, D ... and A', B', C', D' ... whose distance between the adjacent crests A, C on the surface $S_1$ with the smallest radius of curvature is shorter than that $S_2$ between two crests A', C' on the largest radius of curvature.

FIG. 3A shows the undulating strip before it is laid. This strip has the shape of a sinusoid which has been compressed so that the rounded crests of the sinusoid come together to form lobes. This shape which recalls the meanders of a river will be termed hereafter lobed sinusoid. Thus, the strip illustrated in FIG. 3A may be termed lobed sinusoidal corrugation.

Figure 4A:
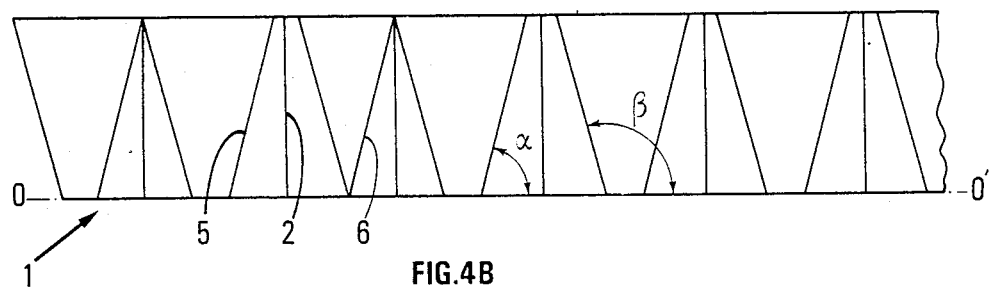
FIGS. 4A, 4b, 4C and 4D show another variant of the invention.
Figure 4B:
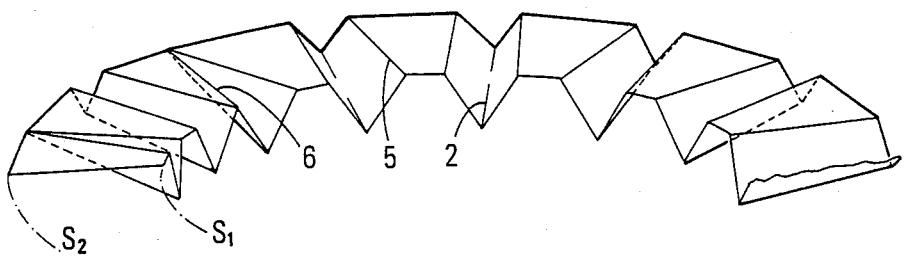

According to another characteristic of the invention (FIG. 4A), a part at least of the folds 2 is substantially perpendicular to the general direction of the strip OO', i.e. to its largest dimension whereas oblique folds 5 and 6, non jointing or jointing, allow the structure of the invention to be obtained after folding (FIG. 4B).

The oblique fold angles $\alpha$ and $\beta$ measured with respect to the same direction OO' are substantially supplementary.

After folding, the sectors defined between two zones of three folds form substantially a flat ring or healix sector. The traces of these folds on the surfaces $S_1$ and $S_2$ of radii $R_1$ and $R_2$ define at least partially the broken lines in the shape of triangles or in the shape of a V whose height relative to the smallest radius $R_1$ is greater than that relative to the largest radius $R_2$.

Figure 4C:
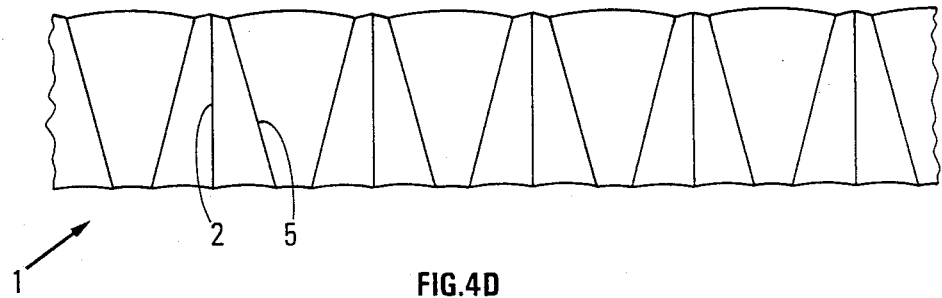
Figure 4D:
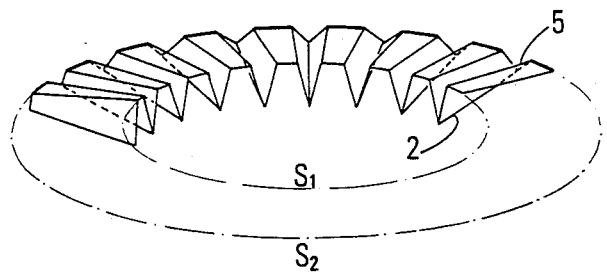

An additional cut out, as is shown in FIG. 4C is made using an appropriate means (for example using scissors, a laser or a high pressure water jet), so as to obtain perfect adequation between the ring or of the helix formed with the tubular surfaces $S_1$ of smallest radius and $S_2$ of largest radius as shown in FIG. 4D, so that the local pressure exerted on the wall is smaller.

A preferred embodiment of the method for producing the insulating structure is carried out in the following way (FIG. 5).

A tube 10 is caused to move longitudinally and at a constant speed by known means not shown in the Figure and shaping and laying apparatus 11 is disposed on a member (not shown) rotating about the tube 10 so as to helically lay the strip 1 formed in the shape of an accordion by the notched device 12 and bonded along its edge to an adhesive ribbon 15 delivered by a reel 13 and applied by means of a presser roller 14 against the strip, this presser roller 14 being disposed on the other side of the pleated strip.

The edge of the strip, during winding, is placed in contact with a plane tangent to the external wall of the tube, perpendicularly to this plane.

Filling is provided by depositing, for example just after contacting of the ribbon 15 carrying tape 1 with tube 10, a foaming composition contained for example in a pressurized reservoir 16.

This foam prepared according to a known technique is for example polyurethane and is expanded between the pleats of the strip.

The ribbon 15 may be possibly adhesive on both surfaces or adhesive only on one of its surfaces, the one in contact with strip 1.

The external tube 17 may for example be formed by winding an adhesive tape 30, depending for example on the width of the ribbon and on the desired covering rate, around and above the insulating structure described above.

The notched device 12 may be replaced by the device described hereafter in a preferred embodiment of the strip in the form of an "ornamental ruff" or lobed sinusoidal corrugation. The difficulty in obtaining such a corrugation comes from the fact that the starting strip 1 must be shaped with lobes designated by L1, L2, L3, L4 in FIG. 3A by means of a forming element having substantially the shape of the bottom of the lobe and which must penetrate through the spaces designated by E1, E2, E3, E4 which are narrower than the shape of the element itself. Thus, the notched device (12) of FIG. 5 is replaced by the device of FIG. 6 which more particularly allows lobed sinusoidal corrugations to be formed continuously.

This device comprises two caterpillar tracks 18a, 18b each being supported by at least two wheels 23 separated by a certain distance so as to provide a rectilinear portion. These caterpillar tracks are placed opposite each other and are imbricated with each other over a portion of their length corresponding substantially to the facing rectilinear portion of each of the tracks.

Of course, at least one wheel 23 may be motor driven.

Each track 18a, 18b includes a belt or chain 20 which supports arms or pairs of arms respectively 24, 25 which are disposed at regular intervals. Each arm or pair of arms supports an element for shaping the strip. FIG. 6A shows a detail of chain 20. In this FIG. reference 26 designates a link of this chain, this link has two side plates 27 and 28 which are joined together by two link pins 29 and 30. Each side plate 27, 28 has an arm 31, 32. Thus the link 26 shown in FIG. 6A has a pair of arms 31, 32. This pair of arms supports an element for shaping the bottom of the lobe of the sinusoid L1, L3, etc.

Of course, the side plates 28 and 27 may be closer to each other than shown in FIG. 6A and may include arms of a half U shape. Since such a half link is known it will not be described further.

In the case of FIG. 6A, the shaping element is a roller 33 which may rotate freely about an axis of rotation 34 on a journalled shaft 35.

The elements for shaping the strips such as rollers 33 (FIG. 6A) are coated with an antiadhesive material, such as silicon rubber or polytetrafluoroethylene.

A part of the rollers is situated in a hot zone 21 where the shape stabilizing heat treatment is carried out, whereas another part is situated in a cooling zone 22, for continuously recovering a shaped and stabilized strip.

Progressively as the caterpillar track advances, the strip 1 to be shaped is engaged between the lower rollers 36, 37, 38 carried by the upper track 18a and the upper rolls 39, 40, 41 carried by the lower track 18b. The assembly passes through an oven 21 where physical and/or chemical evolutions occur establishing the shape while eliminating the largest part of the shaping stresses.

Subsequent cooling, outside the oven, stabilizes this shape before discharge at the end of the track.

It is the combination of wheels 23, of the tracks with arms 32 of rollers 33, 36 to 41 and of the rectilinear portions of the tracks which produce the lobed sinusoidal corrugations and, of course, the positioning of the oven on the rectilinear part where the tracks are imbricated.

The shape of the lobed sinusoidal corrugations is obtained directly when the diameter of a roller is greater than half the distance separating the axes of two successive rollers in the same track when these latter are in a rectilinear portion, this distance being called: pitch of the caterpillar track.

When the diameter of the roller is equal to the pitch of the tracks, the crests of the successive lobes (L1, L3) situated on the same side of the corrugations touch each other and the spaces E2 and E4 are zero, this of course before the corrugations have been positioned on the tube which they are to equip. However, such an embodiment assumes that, during passage through the oven, the contact between two zones of the strip does not result in bonding thereof. To avoid this risk, the diameter of the roller will be preferably slightly less than the pitch of the track.

Of course, if the roller has a diameter less than half the pitch of the tracks, the corrugations will be sinusoidal but will have no lobe since the ribbon portions which extend on each side of the loop, rounded part, or crest of a wave, will gradually move apart. In this case, it will still be possible by subsequent treatment to obtain lobed corrugations for example by compressing the sinusoidal corrugations and by subjecting them to a stabilizing heat treatment.

The lobed sinusoidal corrugations may be obtained with the caterpillar track device because the distance between the axes of two successive rollers of the same track increases when the portion of the chain supporting these rollers passes over wheel 23. This is illustrated on the right hand part of FIG. 6. Of course, this is due to the presence of the arms 24, 32. Similarly, the axes of the rollers draw closer together again when the track reaches the rectilinear portion. Meantime, the ribbon 1 has been positioned.

The strip is discharged by an identical mechanism as is shown on the left of FIG. 6.

After discharge the corrugations assume substantially the shape they had when they were in the imbricated rectilinear zone of the tracks since it was stabilized by passing through the oven 21.

The input wheels 23 on the right of FIG. 6, of the caterpillar tracks 18a and 18b, as well as the outlet wheels 23 on the left of FIG. 6 are placed substantially opposite each other.

Positioning may be achieved with the strip shaped such as it is, or after bonding of its edge to an adhesive ribbon, as described above for the structure with accordion pleats.

The formation of oblique pleats or folds (FIG. 4) requires the use of shaping tools mounted on cones or rings.

Contrary to the undulations ("ruffs") or to the accordion pleats, the strip thus puckered cannot be stored in the form of a ring, but rather in the form of a helix.

The following examples illustrate the invention.

In the first example, a strip of paper is provided preimpregnated for example with phenolic resin in state B (fusible and soluble) of a width of 5 cm which is folded back on itself so as to form an accordion pleat as shown in FIGS. 2A and 2B.

This strip folded back on itself, without pressure, is baked in an oven so as to stabilize the shape by causing the resin to pass from state B to state C (infusible and insoluble), in other words, the resin is remelted and it is caused to cross link. This strip is thus stabilized in its new shape.

This strip is then wound radially about a tube so as to create a space around which an external sheath or tube will be placed. Before placing this external sheath, a semi rigid polyurethane composition is foamed into the air space included in the structure of the invention, which forms an insulating foam of a voluminal mass of 28 kg/m$^3$.

This foam reinforced by the stabilized paper strip is almost as insulating as if it were along; on the other hand, the insulation is much more rigid in the radial direction, although it is almost as flexible as without reinforcement in the longitudinal direction of the tube.

This latter characteristic is of no advantage if this insulation is laid on a rigid tube, but is on the other hand very precious if such an insulation is laid on a flexible tube.

In a second example, the above mentioned phenolic resin preimpregnated paper strip is laid between two steel rollers coated with a non stick agent, so as to give it the shape of an undulating structure, comparable to an ornamental vestimentary "ruff" (FIGS. 3A, 3B). The whole then passes through an oven so as to cross link the resin.

The strip is then placed radially about a tube and is filled with foam as in the preceding example.

In the third example, comparative with respect to the prior art, which will serve as a first reference, only a few centering means are placed spaced apart between the internal tube and the external tube and the same foam as in the preceding examples is caused to foam between the two tubes. In the first three examples, the voluminal mass of the foam formed is 28 kg/m$^3$.

In a fourth comparative example, as in the preceding example, the space created between two tubes by the centering means is filled with a flexible urethane foam but this time it is not a very light foam which is used as in the three preceding examples, but a dense foam with a voluminal mass of 350 kg/m$^3$.

Then comparative measurements were made of the thermal and mechanical properties on the four insulated tubes formed in the preceding examples. Thus, were obtained:

thermal properties:
  Thermal coefficient of conductivity $\lambda$ measured in accordance with the standard ASTM C 518:
    Example 1: $\lambda = 0.040$ watts/meter
    Example 2: $\lambda = 0.038$ watts/meter
    Example 3: $\lambda = 0.029$ watts/meter
    Example 4: $\lambda = 0.056$ watts/meter.

The reinforced foam of the invention is more conducting than the non reinforced foam of comparable density. It is on the other hand much more insulating than the heavy foam which has however lower mechanical properties, as will be seen below.

mechanical properties:
  Resistance under compression measured in accordance with the method ASTM D 1621:
    Example 1: 6.3 bars for a deformation of 3.6%
    Example 2: 8.2 bars for a deformation of 4.1%
    Example 3: 0.8 bars for a deformation of 20.0%
    Example 4: 2.1 bars for a deformation of 10.0%
  longitudinal flexibility:
    The tubes of examples 1, 2 and 3 are as easy to wind as each other, the tube of example 4 is much stiffer and difficult to wind about a drum of small diameter, for example ten times the diameter of the tube.

voluminal mass:
  The voluminal masses measured for the finished insulating product are:
    Example 1: 65 kg/m$^3$
    Example 2: 58 kg/m$^3$
    Example 3: 28 kg/m$^3$
    Example 4: 350 kg/m$^3$ It can be seen that the reinforced foam of example 2 is most resistant although it is incomparably lighter than the single dense foam and much more insulating. The reinforced foam of example 1 has however honourable performances, considering especially the ease of formation of such a structure, easier to form than the undulating structure.

Such a structure, pipe line plus lagging, has a real advantage for it may be subjected to high external pressures without letting the material serving as heat insulation be crushed. In fact, the radial forces are transmitted by the structure of the invention to the internal tube which must in any case be mechanically tough so as to resist the internal and external pressure forces due to the environment, whether it is heat insulated or not.

What is claimed is

1. A tubular structure comprising an internal tube having a first radius, an external tube having a second radius, the radius of the internal tube being smaller than that of the external tube and the external tube being spaced outwardly from the internal tube and a corrugated strip formed of a straight strip folded or undulated, the width of the strip being disposed substantially radially to said internal tube, said strip being arranged on and around the internal tube space with an outer edge of the strip contacting an inner wall of the external tube to provide a reinforcement structure extending along the internal tube via spaces between said internal tube and said external tube; the space between said internal tube and said external tube being partially filled with an insulating material.

2. The structure as claimed in claim 1 wherein the straight strip is folded alternately in groups of three folds, a direction of a medium fold being substantially perpendicular to a main direction of the strip and a direction of the other two folds with respect to said main direction of the strip forming substantially supplementary angles, wherein said strip has a zone between said groups of folds which, after positioning, is at least partially in the form of a ring or helix and traces of said folds on the internal and external tubes with respectively smaller and larger radii define at least partially broken lines in the form of a triangle whose height relative to the smallest radius is greater than that relative to the largest radius.

3. The structure as claimed in claim 2, wherein the strip has a main dimension disposed substantially circumferentially, longitudinally or helically on said tubes.

4. The structure as claimed in claim 3, wherein said strip includes fibers impregnated with heat hardenable or thermoplastic resin.

5. The structure as claimed in claim 4, wherein said fibers include glass, carbon or, aramide fibers in the form of felts or fabrics.

6. The structure as claimed in claim 3, wherein said strip is made from a thermoplastic resin.

7. The structure as claimed in claim 1, wherein said internal tube surrounds a pipe line, so that said structure forms an external insulating sheath for this pipe line.

8. The structure as claimed in claim 1, wherein a pipe line forms said internal tube.

9. The structure as claimed in claim 1, wherein said strip adheres at least partially to said internal tube.

* * * * *